(12) United States Patent
Nishijima et al.

(10) Patent No.: US 6,925,835 B2
(45) Date of Patent: Aug. 9, 2005

(54) EJECTOR CYCLE

(75) Inventors: Haruyuki Nishijima, Obu (JP);
Hisatsugu Matsunaga, Anjo (JP);
Tooru Ikemoto, Chiryu (JP);
Hirotsugu Takeuchi, Nagoya (JP);
Takeharu Asaoka, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/869,724

(22) Filed: Jun. 16, 2004

(65) Prior Publication Data

US 2004/0255612 A1 Dec. 23, 2004

(30) Foreign Application Priority Data

Jun. 19, 2003 (JP) ........................................ 2003-174678

(51) Int. Cl.[7] ................................................ F25B 1/06
(52) U.S. Cl. ............................................ 62/500; 62/116
(58) Field of Search ........................ 62/500, 528, 191, 62/175, 116

(56) References Cited

U.S. PATENT DOCUMENTS

| | | | | |
|---|---|---|---|---|
| 6,438,993 B2 | * | 8/2002 | Takeuchi et al. | 62/500 |
| 6,550,265 B2 | * | 4/2003 | Takeuchi et al. | 62/324.2 |
| 6,604,379 B2 | * | 8/2003 | Hotta et al. | 62/500 |
| 6,675,609 B2 | * | 1/2004 | Takeuchi et al. | 62/500 |
| 6,729,149 B2 | * | 5/2004 | Takeuchi | 62/191 |
| 6,729,158 B2 | * | 5/2004 | Sakai et al. | 62/500 |

FOREIGN PATENT DOCUMENTS

JP          6-11197          1/1994

* cited by examiner

*Primary Examiner*—Melvin Jones
(74) *Attorney, Agent, or Firm*—Harness, Dickey & Pierce, PLC

(57) ABSTRACT

In an ejector cycle with an ejector including a nozzle for decompressing refrigerant, a refrigerant outlet is provided in an evaporator at a position upper than a refrigerant inlet. Therefore, a circulation performance of refrigerant flowing in the evaporator can be improved. Accordingly, even when a pumping capacity generated in the ejector becomes smaller, a sufficient amount of refrigerant can be drawn into the ejector from the evaporator. Thus, a refrigerant amount supplied to the evaporator can be effectively increased. Further, a control unit controls an amount of cooling air supplied to a condenser based on the temperature of the cooling air, to control a refrigerant state to be introduced to the nozzle. In this case, a pressure increasing amount in the ejector can be effectively increased, and consumption power in the compressor can be effectively increased.

29 Claims, 7 Drawing Sheets

EJECTOR CYCLE

CROSS-REFERENCE TO RELATED APPLICATION

This application is related to and claims priority from Japanese Patent Application No. 2003-174678 filed on Jun. 19, 2003, the contents of which are hereby incorporated by reference.

BACKGROUND OF THE INVENTION

1. Field of the Invention

The present invention relates to an ejector cycle including an ejector. The ejector cycle is suitably used for a vapor compression refrigerator for cooling a compartment.

2. Description of Related Art

In an ejector cycle described in JP-A-6-11197, refrigerant is decompressed and expanded in a nozzle of an ejector so that gas refrigerant evaporated in an evaporator is sucked, and pressure of refrigerant to be sucked into a compressor is increased by converting expansion energy to pressure energy. In the ejector cycle, refrigerant discharged from the compressor is circulated to a condenser (radiator) so as to radiate heat absorbed in the evaporator. The refrigerant cooled in the condenser is decompressed and expanded in iso-enthalpy, and refrigerant evaporated in the evaporator is drawn into the ejector by pumping operation due to entrainment of high-speed refrigerant jetted from the nozzle. That is, by the pumping operation generated in the ejector, low-pressure side refrigerant circulates a gas-liquid separator→the evaporator→the ejector→the gas-liquid separator, in this order. Accordingly, when a pumping capacity generated in the ejector reduces, coefficient of performance (COP) of the ejector cycle is decreased. Accordingly, it is difficult to sufficiently improve the COP in the ejector cycle. Here, the COP is a ratio of a cooling capacity generated in the evaporator to a consumption power of the compressor.

SUMMARY OF THE INVENTION

In view of the foregoing problems, it is an object of the present invention to provide an ejector cycle having an ejector, which sufficiently improve coefficient of performance (COP).

It is another object of the present invention to provide an ejector cycle, which effectively increases a refrigerant circulation amount in an evaporator.

It is a further another object of the present invention to provide an ejector cycle, which reduces a consumption power in a compressor.

According to an aspect of the present invention, an ejector cycle includes a compressor for drawing and compressing refrigerant, a high-pressure heat exchanger for cooling high-pressure refrigerant discharged from the compressor, a low-pressure heat exchanger for evaporating low-pressure refrigerant after being decompressed, an ejector and a gas-liquid separator for separating refrigerant from the ejector into gas refrigerant and liquid refrigerant. The ejector includes a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger. Further, the gas-liquid separator has a gas refrigerant outlet coupled to a refrigerant suction side of the compressor, and a liquid refrigerant outlet coupled to a refrigerant inlet side of the low-pressure heat exchanger.

In the ejector cycle, the low-pressure heat exchanger has a refrigerant outlet coupled to a refrigerant suction port of the ejector, and the refrigerant outlet is provided in the low-pressure heat exchanger at a position upper than the refrigerant inlet. In the low-pressure heat exchanger (evaporator), the refrigerant is evaporated so that cooling capacity can be obtained. Therefore, in the low-pressure heat exchanger, gas refrigerant increases in accordance with the evaporation, and moves upwardly more than the liquid refrigerant. Thus, even when pumping capacity generated in the ejector is small, a sufficient amount of gas refrigerant can be readily drawn into the ejector from the low-pressure heat exchanger. Accordingly, a sufficient amount of refrigerant can be effectively supplied to the low-pressure heat exchanger, and COP of the ejector cycle can be improved. For example, the refrigerant inlet is positioned around a bottom end of the low-pressure heat exchanger and the refrigerant outlet is positioned around a top end of the low-pressure heat exchanger, such that refrigerant flows through the low-pressure heat exchanger upwardly from below.

According to another aspect of the present invention, in the ejector cycle, a control unit controls a refrigerant state to be introduced to the nozzle so as to control an adiabatic heat drop of refrigerant in the nozzle more than a predetermined value. In this case, a pressure increasing amount in the ejector is increased, a consumption power in the compressor can be made smaller, and the COP of the ejector cycle can be improved.

Preferably, a pressure detection means is provided for detecting a pressure of the high-pressure refrigerant discharged from the compressor. Further, the control unit controls an amount of cooling air supplied to the high-pressure heat exchanger based on the pressure detected by the pressure detection means, to control the refrigerant state to be introduced to the nozzle. Alternatively, a temperature detection means is provided for detecting a temperature of the cooling air supplied to the high-pressure heat exchanger. In this case, the control unit controls the amount of the cooling air supplied to the high-pressure heat exchanger based on the temperature detected by the temperature detection means, to control the refrigerant state to be introduced to the nozzle.

According to a further another aspect of the present invention, a control unit controls a pressure of the high-pressure refrigerant discharged from the compressor so as to control a pressure of refrigerant flowing to the nozzle more than a predetermined value. In this case, it is possible to control the refrigerant state so as to control the adiabatic heat drop of refrigerant in the nozzle more than the predetermined value.

Preferably, the control unit controls the amount of the cooling air supplied to the high-pressure heat exchanger based on the temperature detected by the temperature detection means, to control the pressure of refrigerant flowing to the nozzle more than the predetermined value.

According to a further another aspect of the present invention, in the ejector cycle, a control unit reduces the amount of the cooling air supplied to the high-pressure heat exchanger in accordance with a temperature reduce of the cooling air. Therefore, it is possible to control the pressure of the high-pressure refrigerant so that the pressure of refrigerant flowing to the nozzle becomes more than the predetermined pressure.

Preferably, the control unit has an upper limit control means for controlling a pressure of the high-pressure refrigerant discharged from the compressor to be lower than an upper limit value. Therefore, it can prevent the pressure of the high-pressure refrigerant from being excessively increased.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

In the first embodiment, an ejector cycle is typically used as a vapor compression refrigerator for a showcase for cooling and refrigerating foods and drinks or as a vapor compression refrigerator mounted in a vehicle for transporting foods and drinks while keeping at a cooling or refrigerating state.

Figure 1:
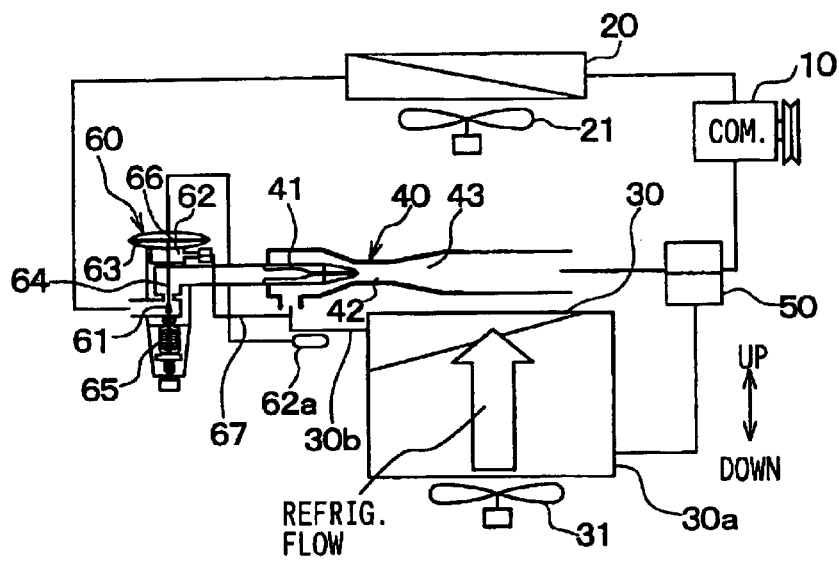
FIG. 1 is a schematic diagram showing an ejector cycle according to a first preferred embodiment of the present invention.

In the ejector cycle of FIG. 1, a compressor 10 is an electric compressor or a compressor driven by a vehicle engine, for sucking and compressing refrigerant circulated in the ejector cycle. A condenser 20 (cooler, radiator) is a high-pressure heat exchanger for cooling high-temperature and high-pressure refrigerant discharged from the compressor 10 by performing heat-exchange operation between outside air and the high-temperature and high-pressure refrigerant. A condenser fan 21 is an electrical blower for blowing outside air (cooling medium, cooling air) to the condenser 20.

Further, an evaporator 30 is a low-pressure heat exchanger for cooling air to be blown into a compartment such as the showcase by evaporating liquid refrigerant, more specifically, by performing heat-exchange operation between the air and low-pressure refrigerant. The evaporator 30 has a refrigerant inlet 30a for introducing refrigerant, and a refrigerant outlet 30b for discharging the refrigerant after performing heat exchange. In this embodiment, the refrigerant outlet 30b is provided in the evaporator 30 at a position upper than the refrigerant inlet 30a. Therefore, refrigerant flows in the evaporator 30 upwardly from below when being viewed in its entirety. An evaporator fan 31 is an electrical blower for blowing air to the evaporator 30 and for blowing the cooled air into a compartment (showcase).

An ejector 40 sucks refrigerant evaporated in the evaporator 30 while decompressing and expanding refrigerant flowing out of the condenser 20 in a nozzle 41, and increases pressure of refrigerant to be sucked into the compressor 10 by converting expansion energy to pressure energy.

The ejector 40 includes the nozzle 41, a mixing portion 42, and a diffuser 43. The nozzle 41 decompresses and expands high-pressure refrigerant flowing into the ejector 40 in iso-enthalpy by converting pressure energy of the high-pressure refrigerant from the condenser 20 to speed energy thereof. The mixing portion 42 sucks refrigerant evaporated in the evaporator 30 by using an entrainment function of high-speed refrigerant stream injected from the nozzle 41, and mixes the sucked refrigerant and the refrigerant jetted from the nozzle 41. Further, the diffuser 43 mixes the refrigerant injected from the nozzle 41 and the refrigerant sucked from the evaporator 30, and increases the refrigerant pressure by converting speed energy of the mixed refrigerant to pressure energy thereof.

In the mixing portion 42, a drive stream of refrigerant from the nozzle 41 and a suction stream of the refrigerant from the evaporator 30 are mixed so that their momentum sum is conserved, thereby increasing refrigerant pressure. In the diffuser 43, because a refrigerant passage sectional area gradually increases toward its outlet side, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure-increasing portion is constructed with the mixing portion 42 and the diffuser 43.

In the first embodiment, "Laval nozzle" (refer to Fluid Engineering published by Tokyo University Publication) is adopted as the nozzle 41 to accelerate refrigerant injected from the nozzle 41 equal to or higher than the sound velocity. Here, the Laval nozzle 41 includes a throttle having the smallest passage area in its refrigerant passage. However, a nozzle tapered toward its outlet side can be used as the nozzle 41.

In FIG. 1, refrigerant is discharged from the ejector 40, and flows into a gas-liquid separator 50. The gas-liquid separator 50 separates the refrigerant from the ejector 40 into gas refrigerant and liquid refrigerant, and stores the separated gas refrigerant and the separated liquid refrigerant therein. The gas-liquid separator 50 includes a gas-refrigerant outlet connected to a suction port of the compressor 10, and a liquid-refrigerant outlet connected to the refrigerant inlet 30a of the evaporator 30. Accordingly, in the ejector cycle, liquid refrigerant from the gas-liquid separator 50 flows into the evaporator 30 while refrigerant from the condenser 20 is decompressed in the nozzle 41 of the ejector 40.

A throttle can be disposed between the gas-liquid separator 50 and the evaporator 30, for decompressing refrigerant flowing from the gas-liquid separator 50 toward the evaporator 30. Further, an oil return passage can be provided in the gas-liquid separator 50, so that lubrication oil separated by the gas-liquid separator 50 can be sucked to the compressor 10.

A variable throttle device 60 is disposed in a refrigerant passage between the condenser 20 and the ejector 40. The variable throttle device 60 is an expansion valve disposed upstream from the nozzle 41 of the ejector 40, which decompresses high-pressure refrigerant flowing from the condenser 20 to a gas-liquid two-phase state. The variable throttle device 60 controls its throttle open degree so that a super-heating degree of refrigerant at a refrigerant outlet side of the evaporator 30 becomes in a predetermined range (e.g., 0.1–10 degrees).

Specifically, the variable throttle device 60 includes a valve body 61 for changing a throttle open degree, a thin film diaphragm 63, a connection rod 64, a spring 65 and an outer pipe 67. The thin film diaphragm 63 is constructed to define a back pressure chamber 62 having an inner pressure that changes by sensing a refrigerant temperature at a refrigerant outlet side of the evaporator 30, a pressure chamber 66 opposite to the back pressure chamber 62 with respect to the diaphragm 63. The connection rod 64 is connected to the valve body 61 and the diaphragm 63 so that a displacement of the diaphragm 63 is transmitted to the valve body 61. The spring 65 is biased so that its spring force is applied to the valve body 61 in a direction where the volume of the back pressure chamber 62 is reduced. The outer pipe 67 is a pressure introducing means for introducing a refrigerant pressure at the refrigerant outlet side of the evaporator 30 to the pressure chamber 66 opposite to the back pressure chamber 62 with respect to the diaphragm 63.

The back pressure chamber 62 communicates with a temperature sensing portion 62a that senses a refrigerant temperature at the refrigerant outlet side of the evaporator 30, so that the refrigerant temperature at the refrigerant outlet side of the evaporator 30 is transmitted to the back pressure chamber 62 through the temperature sensing portion 62a.

In this embodiment, the valve body 61, the diaphragm 63 and the connection rod 64 are made of metal such stainless steel, and a valve case member for forming the back pressure chamber or the pressure chamber 66 is made of metal such as aluminum, for example. Further, an adjustment screw is disposed to absorb a manufacturing difference of the variable throttle device 60, and to adjust the spring force to be applied to the diaphragm 63 so that a refrigerant super-heating degree at the refrigerant outlet side of the evaporator 30 becomes in a predetermined range.

For example, when the pressure in the evaporator 30, that is, the thermal load in the evaporator 30 becomes higher so that the refrigerant super-heating degree at the refrigerant outlet side of the evaporator 30 becomes higher, the throttle open degree of the variable throttle device 60 is made smaller. In this case, a flow speed of refrigerant (drive flow) jetted from the nozzle 41 is increased, and thereby increasing an amount of refrigerant (suction-flow refrigerant) circulating in the evaporator 30. Conversely, when the pressure in the evaporator 30, that is, the thermal load in the evaporator 30 becomes lower so that the refrigerant super-heating degree at the outlet side of the evaporator 30 becomes lower, the throttle open degree of the variable throttle device 60 is made larger. In this case, a flow speed of refrigerant (drive flow) jetted from the nozzle 41 is decreased, and thereby decreasing the amount of refrigerant (suction-flow refrigerant) circulating in the evaporator 30.

Next, operation of the ejector cycle according to the first embodiment will be now described.

As shown in FIG. 1, refrigerant discharged from the compressor 10 circulates toward the condenser 20. Then, high-pressure refrigerant from the compressor 10 is cooled in the condenser 20 and is decompressed in the variable throttle device 60 in iso-enthalpy to a gas-liquid two-phase state. Thereafter, refrigerant from the variable throttle device 60 is further decompressed in the nozzle 41 of the ejector 40 in iso-enthalpy, so that the refrigerant speed at the outlet of the nozzle 41 of the ejector 40 becomes equal to or higher than the speed of the sound. Thereafter, refrigerant from the outlet of the nozzle 41 flows into the mixing portion 42 of the ejector 40.

Refrigerant flowing into the variable throttle device 60 is decompressed by the variable throttle device 60 so as to boil once at an inlet side of the nozzle 41. Therefore, bubbles are generated by the variable throttle device 60, and boiling cores are generated after the bubbles disappear at the inlet side of the nozzle 41. Refrigerant with the boiling cores is further boiled by the nozzle 41, so that fine liquid drops (i.e., minute liquid drops) of refrigerant are generated. Because the boiling of refrigerant is facilitated in the nozzle 41, the generation of minute liquid drops of the refrigerant can be facilitated in the nozzle 41. Accordingly, the nozzle efficiency can be effectively improved.

In the first embodiment, freon is used as the refrigerant so that a refrigerant pressure at the high pressure side is lower than the critical pressure of the refrigerant. Therefore, the refrigerant pressure flowing into the nozzle 41 is lower than the critical pressure of the refrigerant.

The mixing portion 42 sucks refrigerant evaporated in the evaporator 30 by pumping operation due to the entrainment function of high-speed refrigerant stream injected from the nozzle 41, and mixes the sucked refrigerant and the injected refrigerant therein. Further, the diffuser 43 mixes the refrigerant injected from the nozzle 41 and the refrigerant sucked from the refrigerant outlet 30b of the evaporator 30, and increases the refrigerant pressure. Therefore, the ejector efficiency can be improved. Accordingly, low-pressure refrigerant in the gas-liquid separator 50 circulates the evaporator 30 and the pressure increasing portion of the ejector 40, in this order, and returns to the gas-liquid separator 50.

In this embodiment of the present invention, the cooling capacity (refrigerating capacity) can be obtained by evaporating refrigerant in the evaporator 30. In the evaporator 30, gas refrigerant is increased with the refrigerant evaporation, and is moved to an upper side more than the liquid refrigerant because the density of the gas refrigerant is smaller than the density of the liquid refrigerant.

According to the first embodiment of the present invention, the refrigerant outlet 30b is positioned in the evaporator 30 upper than the refrigerant inlet 30a. Therefore, a circulation performance of refrigerant flowing in the evaporator 30 can be improved. For example, the refrigerant outlet 30b is provided at a top portion of the evaporator 30 or around the top portion of the evaporator 30, and the refrigerant inlet 30a is provided at a bottom portion of the evaporator 30 or around the bottom portion of the evaporator 30.

Accordingly, even when the pumping function generated in the ejector 40 is small, a sufficient amount of refrigerant can be drawn into the pressure increasing portion of the ejector 40 from the refrigerant outlet 30b of the evaporator 30. Therefore, a sufficient amount of refrigerant can be supplied to the evaporator 30 from the gas-liquid separator 50, and the COP of the ejector cycle can be effectively improved.

Figure 2:
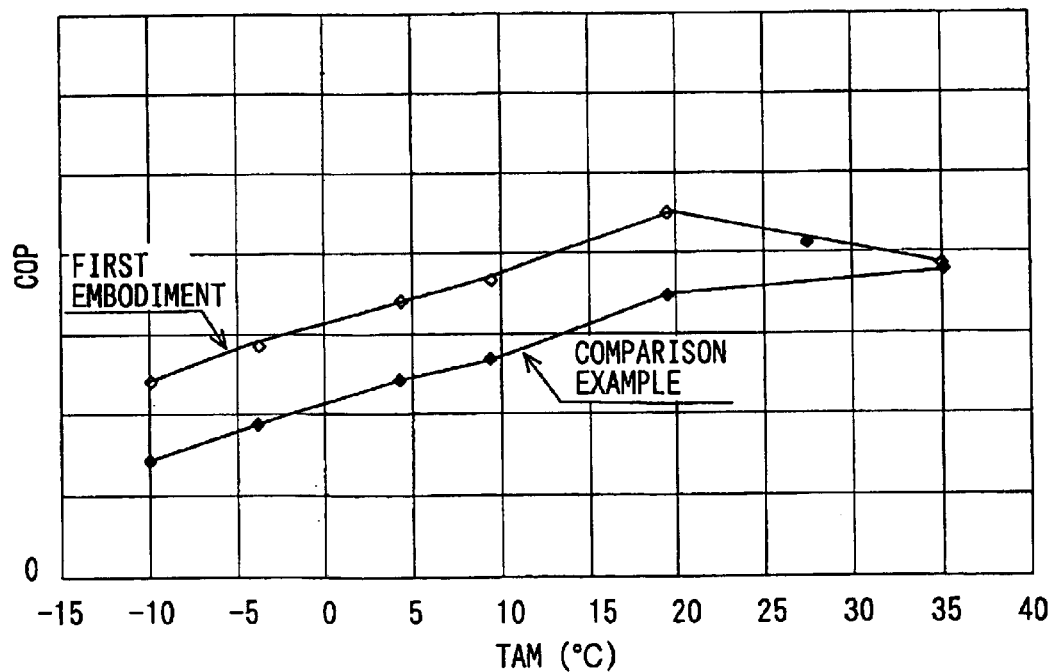
FIG. 2 is a graph showing a relationship between COP and an outside air temperature TAM, for explaining an advantage of the first embodiment.

FIG. 2 shows a relationship between the COP of the ejector cycle and the outside air temperature TAM in the first embodiment, and in a comparison example where the refrigerant inlet 30a and the refrigerant outlet 30b are set at the same position, when an air amount blown by the condenser fan 21 is set constant. As shown in FIG. 2, the COP of the ejector cycle in the first embodiment can be effectively increased as compared with the comparison example.

(Second Embodiment)

Figure 3:
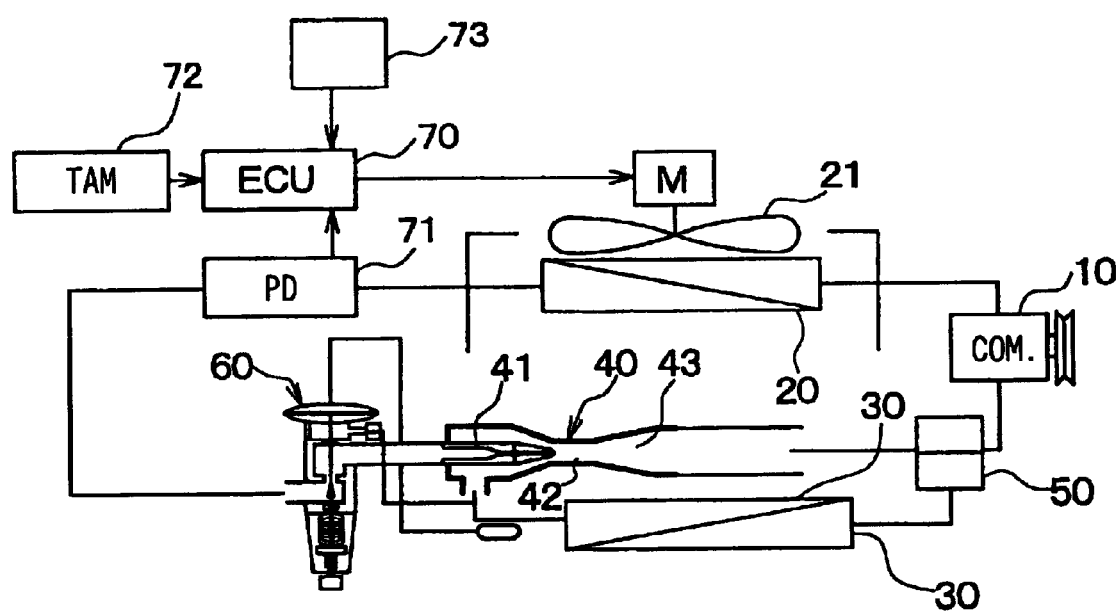
FIG. 3 is a schematic diagram showing an ejector cycle according to a second preferred embodiment of the present invention.

The second embodiment of the present invention will be now described with reference to FIGS. 3 to 7. In the second embodiment, as shown in FIG. 3, a pressure sensor 71 is provided at a refrigerant outlet side of the condenser 20, for detecting a pressure (PD) of high-pressure refrigerant before being decompressed. Further, an outside air temperature sensor 72 is provided to detect a temperature of cooling air supplied to the condenser 20, that is, to detect an outside air temperature TAM. The condenser fan 21 is controlled so that an air blowing amount (fan motor output) from the condenser fan 21 is decreased in accordance with a decrease of the temperature of cooling air (outside air) supplied to the condenser 20. By controlling the condenser fan 21, the pressure of the high-pressure refrigerant to be introduced to the nozzle 41 can be controlled to a pressure more than a predetermined value. That is, a refrigerant state to flow into the nozzle 41 is controlled by controlling the condenser fan 21, so that an adiabatic heat drop of refrigerant in the nozzle 41 becomes larger than a predetermined amount.

An electronic control unit (ECU) 70 is a computer constructed with a nonvolatile such as a ROM or an HDD, a RAM and CPU. The electronic control unit 70 controls components such as the compressor 10, the condenser fan 21 and the evaporator fan 31 based on the detection values of the sensors 71, 72 in accordance with a predetermined program stored in the nonvolatile storage.

A control panel 73 is provided with a start switch (main switch) of the ejector cycle and a setting switch for setting a control temperature in the compartment. The control panel 73 is connected to the electronic control device 70 through a harness.

A control operation of the condenser fan 21 will be now described with reference to FIG. 4. The flow diagram of the control program shown in FIG. 4 starts when the main switch (start switch) of the control panel 73 is turned on, and the flow diagram of the control program shown in FIG. 4 stops when the main switch (start switch) of the control panel 73 is turned off. At step S1, the condenser fan 21 is operated to blow air toward the condenser 20 by a maximum air amount. That is, a voltage applied to the motor of the condenser fan 21 is set at a maximum value.

At step S2, it is determined whether or not the main switch of the control panel 73 is turned on. When the main switch of the control panel 73 is turned off, electrical power is not supplied to the motor of the condenser fan 21. In contrast, when the main switch of the control panel 73 is turned on at step S2, the temperature (TAM) detected by the outside air temperature sensor 72 is input at step S3. That is, the temperature of cooling air (outside air) blown by the condenser fan 21 is detected by the sensor 72, and is input to the electronic control unit 70.

At step S4, the pressure PD of the high-pressure refrigerant detected by the pressure sensor 71 is input, and it is determined whether or not the pressure PD of the high-pressure refrigerant is smaller than a first threshold PD1 (e.g., 2.9 Mpa). When the pressure PD of the high-pressure refrigerant is smaller than the first threshold PD1, the condenser fan 21 is controlled so that the air amount to be blown to the condenser 20 is decreased in accordance with a decrease of the temperature of the cooling air (outside air temperature TAM). That is, the voltage applied to the motor of the condenser fan 21 is decreased in accordance with the decrease of the temperature of the cooling air (outside air temperature TAM).

For example, in the second embodiment, the first threshold is 2.9 Mpa. Further, the air amount blown by the condenser fan 21 is set at a maximum air amount when the outside air temperature TAM becomes about 20° C., and the condenser fan 21, that is, the fan motor is stopped when the outside air temperature TAM becomes 0° C. The second embodiment is not limited to this example shown at step S5 in FIG. 4.

Figure 4:
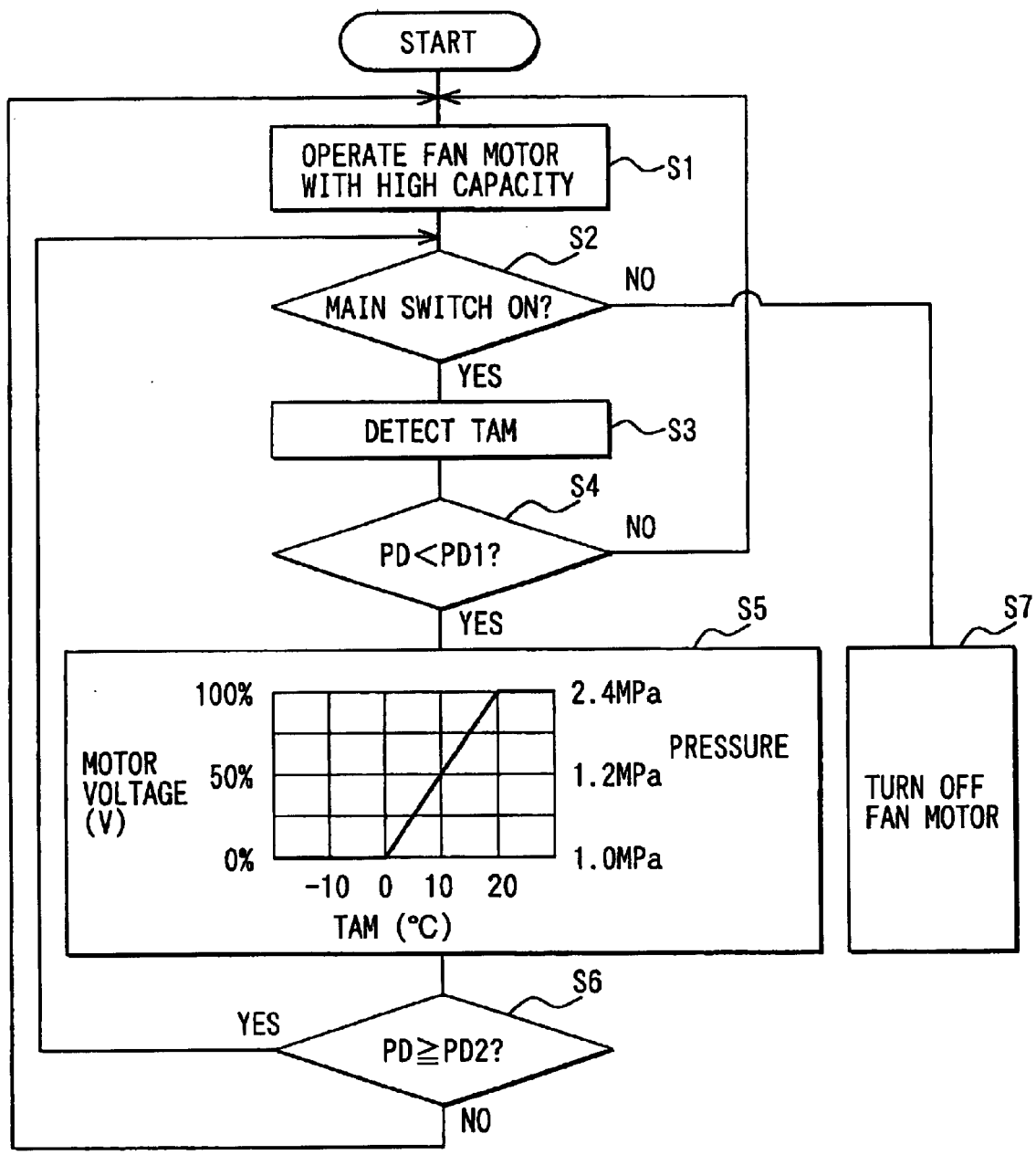
FIG. 4 is a flow diagram showing a control operation of the ejector cycle according to the second embodiment.

As shown at step S5 in FIG. 4, when the air amount to be blown to the condenser 20 is changed in accordance with the outside air temperature TAM, the pressure PD of the high-pressure refrigerant is changed.

Then, when the pressure PD of the high-pressure refrigerant is equal to or higher than a second threshold value PD2 that is higher than the first threshold value at step. S6, it is determined that a damage of a high-pressure component such as the condenser 20 and the compressor 10 may be caused, and the control program returns to step S2. Generally, the second threshold PD2 is set based on a pressure-resistance limit of the high-pressure component to be higher than the first threshold PD1.

When it is determined that the main switch of the control panel 73 is turned off at step S2, the operation of the condenser fan 21 and the compressor 10 is stopped at step S7.

Figure 5:
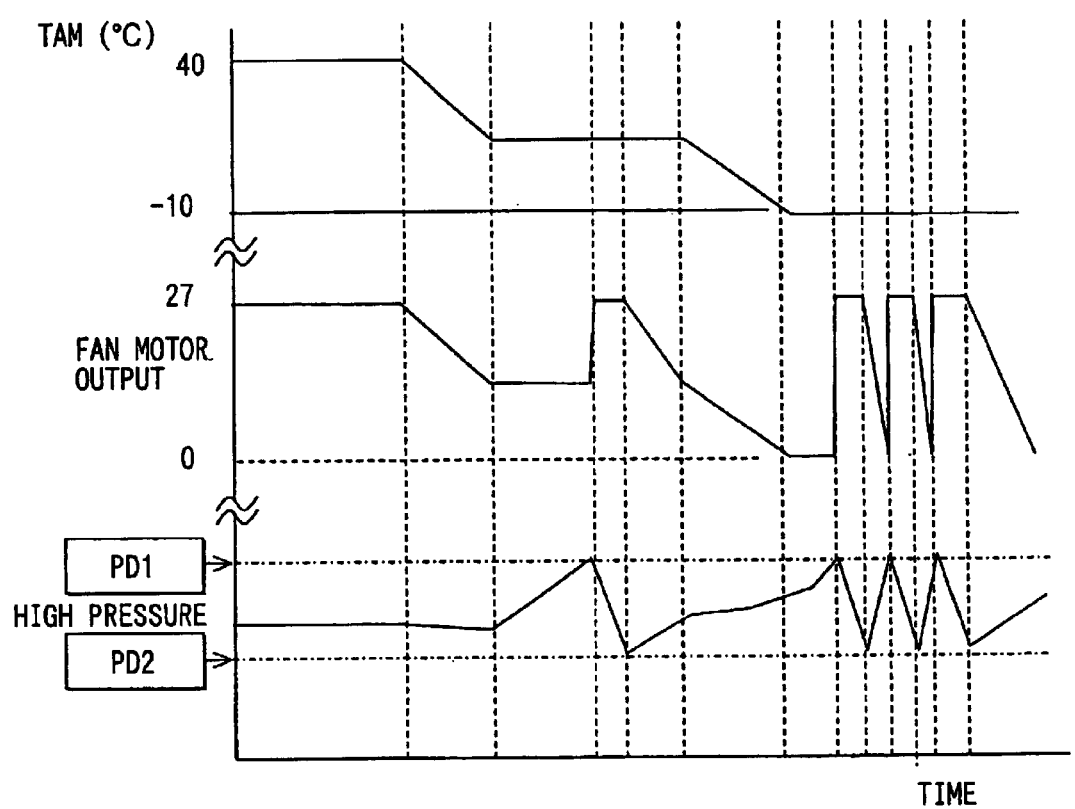
FIG. 5 is a time chart showing variations in an outside air temperature TAM, a fan motor output of a condenser and a refrigerant pressure at a high-pressure side, when a condenser fan control is performed, according to the second embodiment.

FIG. 5 shows a variation example in the air amount blown from the condenser fan 21 (fan motor output voltage) and the pressure of the high-pressure refrigerant when the control of the condenser fan 21 is performed in accordance with the outside air temperature TAM.

Figure 6:
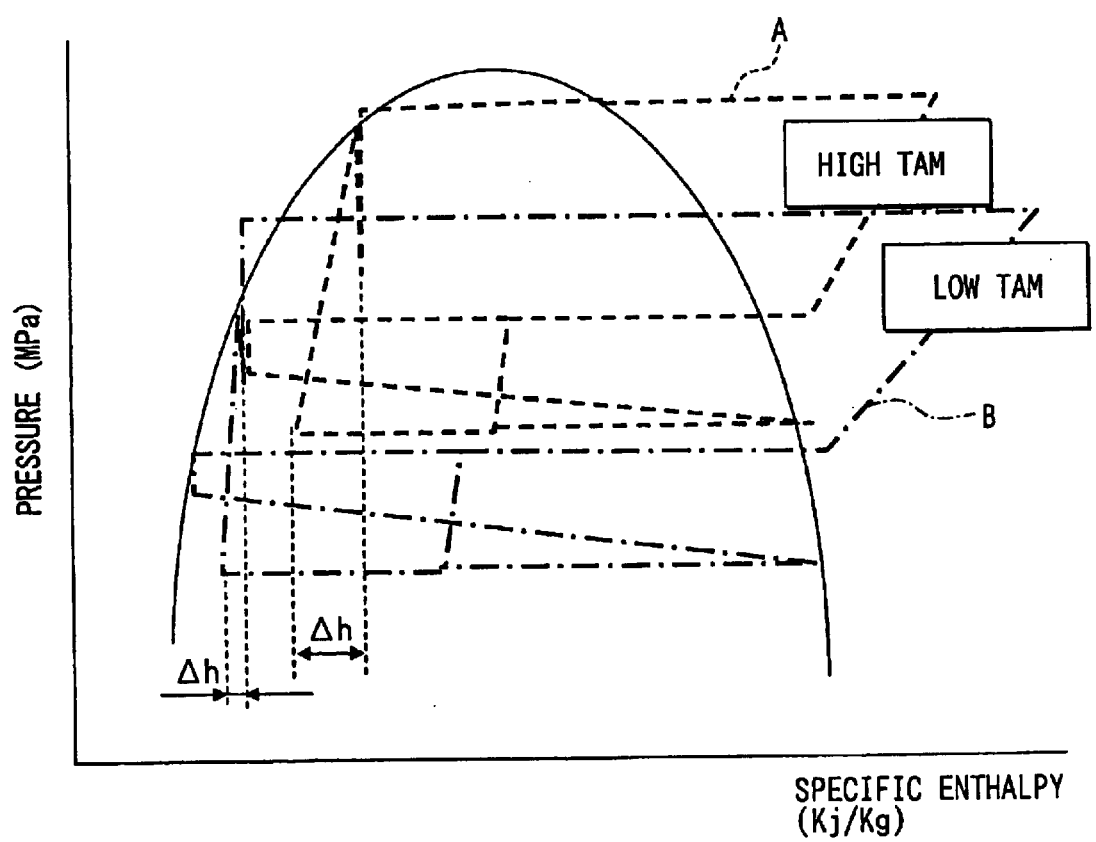
FIG. 6 is a Mollier diagram (p-h diagram) in the ejector cycle of FIG. 3 when an air blowing amount to the condenser is set constant.

Next, operation of the ejector cycle will be now described. FIG. 6 shows p-h diagrams at a high outside air temperature and a low outside air temperature when the air blowing amount to the condenser 20 is set constant. The graph A shown by the dashed line in FIG. 6 shows a refrigerant state at a high outside air temperature (TAM), and the graph B shown by the dot-dashed line shows a refrigerant state at a low outside air temperature (TAM).

An adiabatic heat drop $\Delta h$ of refrigerant in the nozzle 41 is an energy recovered from a high-pressure refrigerant when the refrigerant is expanded in the nozzle 41 in iso-entropy. That is, a decreased enthalpy amount $\Delta h$ of refrigerant decreased while being decompressed in the nozzle in iso-entropy is the energy recovered from the high-pressure refrigerant. As the adiabatic heat drop becomes larger, the pressure of refrigerant to be sucked to the compressor 10 is increased, and the consumption power of the compressor 10 is reduced.

Accordingly, in the second embodiment, the state of the refrigerant flowing into an inlet of the nozzle 41 is controlled so that the adiabatic heat drop $\Delta h$ of refrigerant in the nozzle 41 becomes larger than a predetermined value. Thus, the consumption power of the compressor 10 can be effectively reduced, and the COP of the ejector cycle can be improved.

In the second embodiment, refrigerant is expanded in the nozzle in iso-entropy. An inclination ($=\Delta P/\Delta h$) of the iso-entropy line becomes smaller as the enthalpy of refrigerant flowing into the nozzle 41 becomes larger. Accordingly, as shown in FIG. 6, the adiabatic heat drop Δh of refrigerant in the nozzle 41 becomes larger as the enthalpy of refrigerant flowing to the nozzle 41 becomes larger.

In contrast, the pressure of refrigerant flowing to the nozzle 41, that is, the pressure in the condenser 20 becomes lower as the temperature of cooling air (outside air) blown to the condenser 20 becomes lower. Therefore, as shown in FIG. 6, the adiabatic heat drop Δh of refrigerant in the nozzle 41 becomes smaller as the outside air temperature TAM becomes lower.

According to the second embodiment of the present invention, the air blowing amount toward the condenser 20 is reduced in accordance with a decrease of the outside air temperature TAM. Therefore, it is possible to control the pressure of the high-pressure refrigerant flowing to the nozzle 41 to be higher than a predetermined value, thereby controlling the adiabatic heat drop Δh of the refrigerant in the nozzle 41 to be larger than the predetermined value.

Figure 7:
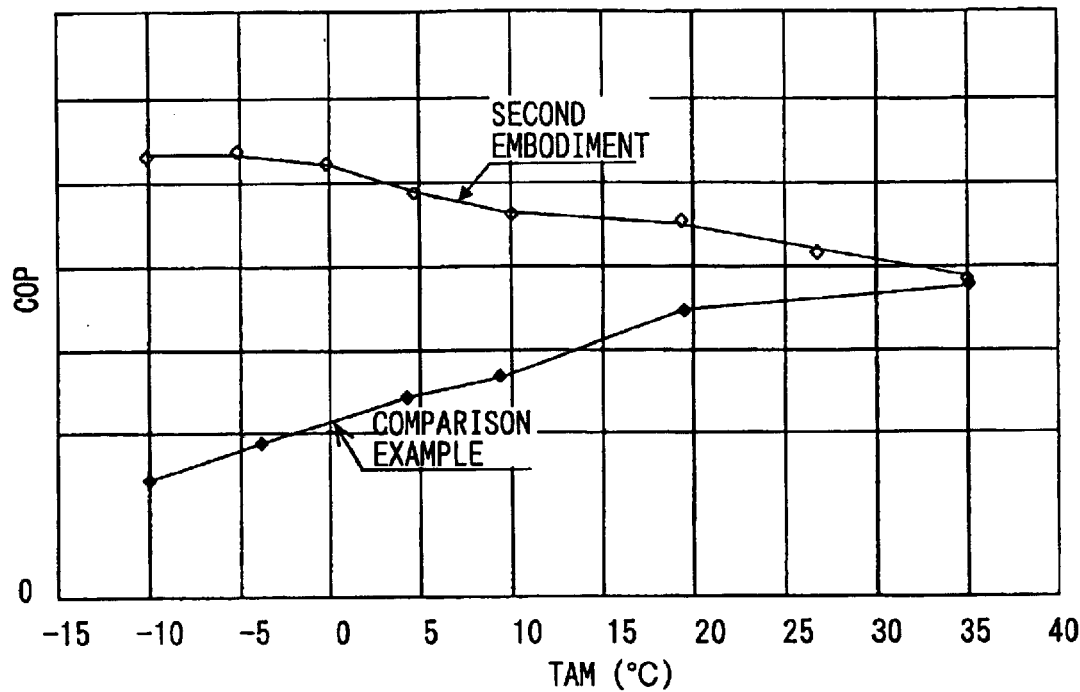
FIG. 7 is a graph showing a relationship between the COP and the outside air temperature TAM, for explaining an advantage of the second embodiment.

In the second embodiment, as shown in FIG. 7, the COP can be improved in a general using area of the outside air temperature TAM, as compared with a comparison example where the air amount blown to the condenser 20 is set constant.

(Third Embodiment)

The third embodiment of the present invention will be now described with reference to FIG. 8. As described in the second embodiment, the high-pressure side refrigerant pressure PD has a relationship with the outside air temperature TAM. In the third embodiment, the air amount blown from the condenser fan 21, that is, the voltage applied to the fan motor of the condenser fan 21 is controlled based on the high-pressure side refrigerant pressure PD detected by the pressure sensor 71.

Next, a control operation of the condenser fan 21 according to the third embodiment will be now described with reference to FIG. 8.

Figure 8:
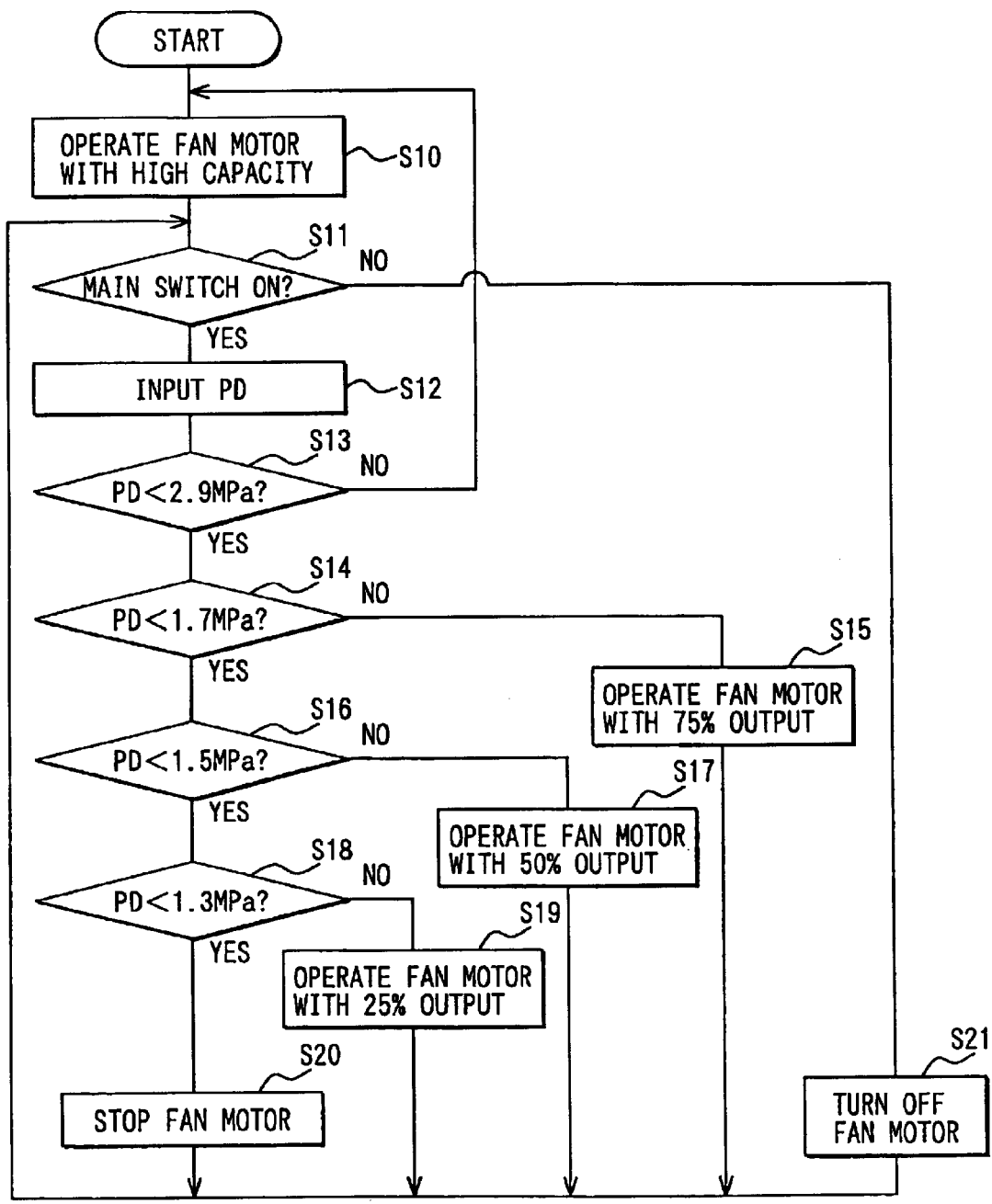
FIG. 8 is a flow diagram showing a control operation of an ejector cycle according to a third preferred embodiment of the present invention.

The flow diagram of the control program shown in FIG. 8 starts when the main switch (start switch) of the control panel 73 is turned on, and the flow diagram of the control program shown in FIG. 8 stops when the main switch (start switch) of the control panel 73 is turned off. At step S10, the condenser fan 21 is operated to blow air toward the condenser 20 by a maximum air amount (high capacity). That is, at step S10, the motor output of the condenser fan 21 is set at maximum (100%), for example. Next, at step S11, it is determined whether or not the main switch of the control panel 73 is turned on. When the main switch of the control panel 73 is turned off, electrical power is not supplied to the motor of the condenser fan 21 at step S21. In contrast, when the main switch of the control panel 73 is turned on at step S11, the high-pressure side refrigerant pressure PD detected by the pressure sensor 71 is input at step S12.

Next, at step S13, it is determined whether or not the high-pressure side refrigerant pressure PD is smaller than a first set value (e.g., 2.9 Mpa). When the high-pressure side refrigerant pressure PD is equal to or higher than the first set value (e.g., 2.9 Mpa), the condenser fan 21 is operated by a maximum air amount (high capacity) at step S10.

When the high-pressure side refrigerant pressure PD is smaller than the first set value (e.g., 2.9 Mpa), it is determined whether or not the high-pressure side refrigerant pressure PD is smaller than a second set value (e.g., 1.7 Mpa) that is smaller than the first set value, at step S14. When the high-pressure side refrigerant pressure PD is equal to or higher than the second set value (e.g., 1.7 Mpa), the condenser fan 21 is operated by an air amount that is about 75% of the maximum air amount, at step S15.

Further, when the high-pressure side refrigerant pressure PD is smaller than the second set value (e.g., 1.7 Mpa), it is determined whether or not the high-pressure side refrigerant pressure PD is smaller than a third set value (e.g., 1.5 Mpa) at step S16. When the high-pressure side refrigerant pressure PD is equal to or higher than the third set value (e.g., 1.5 Mpa) that is smaller than the second set value, the condenser fan 21 is operated by an air amount that is about 50% of the maximum air amount, at step S17.

Further, when the high-pressure side refrigerant pressure PD is smaller than the third set value (e.g., 1.5 Mpa), it is determined whether or not the high-pressure side refrigerant pressure PD is smaller than a fourth set value (e.g., 1.3 Mpa) at step S18. When the high-pressure side refrigerant pressure PD is equal to or higher than the fourth set value (e.g., 1.3 Mpa) that is smaller than the third set value, the condenser fan 21 is operated by an air amount that is about 25% of the maximum air amount, at step S19.

In addition, when the high-pressure side refrigerant pressure PD is smaller than the fourth set value (e.g., 1.3 Mpa), the motor of the condenser fan 21 is stopped at step S20.

When it is determined that the main switch of the control panel 73 is turned off, the condenser fan 21 and the compressor 10 are stopped at step S21.

In the third embodiment, the high-pressure side refrigerant pressure PD can be controlled by controlling the capacity of the condenser fan 21, so that the pressure of the refrigerant flowing to the nozzle 41 becomes more than a predetermined value. Therefore, the adiabatic heat drop Δh of refrigerant in the nozzle 41 can be increased more than a predetermined amount.

In the third embodiment, the air amount blown to the condenser 20 is controlled by controlling a voltage applied to the motor of the condenser fan 21, similarly to the above-described second embodiment.

(Fourth Embodiment)

Figure 9:
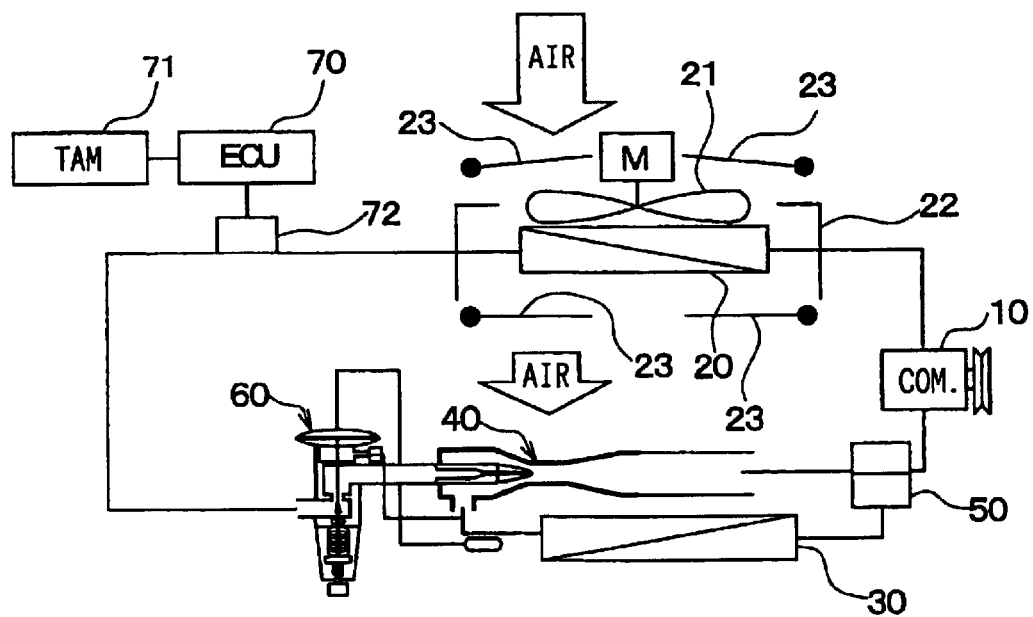
FIG. 9 is a schematic diagram showing an ejector cycle according to a fourth preferred embodiment of the present invention.

In the fourth embodiment, as shown in FIG. 9, a fan shroud 22, for defining an air passage through which air passes through the condenser 20, is provided to cover outsides of the condenser fan 21 and the condenser 20. The fan shroud 22 has an air inlet and an air outlet, and an air flow control door 23 is provided to adjust an opening area of at least one of the air inlet and the air outlet. By adjusting an open degree of the air flow control door 23, the amount of cooling air (outside air) flowing to the condenser 20 can be controlled. The flow amount control door 23 is controlled by the electronic control unit 70. The air flow amount control by using the flow amount control door 23 can be performed based on the outside air temperature TAM or the pressure of the high-pressure side refrigerant discharged from the compressor 10, similarly to the control operation described in the second or third embodiment.

In the fourth embodiment, the air blowing amount to the condenser 20 is controlled mainly by controlling the opening degree of the air flow control door 23. However, the air blowing amount to the condenser 20 can be controlled by controlling both the condenser fan 21 and the air flow control door 23.

Although the present invention has been fully described in connection with the preferred embodiments thereof with reference to the accompanying drawings, it is to be noted that various changes and modifications will become apparent to those skilled in the art.

For example, in the above-described embodiments of the present invention, the variable throttle device 60 is provided upstream of the nozzle 41 of the ejector 40. However, the present invention can be applied to an ejector cycle where the variable throttle device 60 is not provided. That is, the present invention can be applied to an ejector cycle where the high-pressure refrigerant from the condenser 20 directly flows into the nozzle 41 of the ejector 40.

In the above-described embodiments of the present invention, the ejector cycle is used for the vapor-compression refrigerator for cooling and refrigerating the foods in the showcase. However, the ejector cycle of the present invention can be used for a vapor-compression refrigerant cycle of an air conditioner.

In the above-described embodiments, an external pressure-equalization thermal expansion valve is used as the variable throttle device 60. However, an internal pressure-equalization thermal expansion valve can be used as the variable throttle device 60.

In the above-described embodiments, the variable throttle device 60 and the nozzle 41 are separately provided. However, the present invention can be applied to an ejector cycle where the variable throttle device 60 and the nozzle 41 are integrated to construct an integrated variable throttle in the ejector 40.

In the above-described embodiments, freon is used as the refrigerant in the ejector cycle. However, the present invention can be applied to an ejector cycle where the other refrigerant such as carbon hydride and carbon dioxide can be used. Further, the present invention can be applied to an ejector cycle where the refrigerant pressure at the high-pressure side is equal to or higher than the critical pressure of the refrigerant. In this case, natural refrigerant such as carbon dioxide can be suitably used.

Further, in the above-described embodiments, the superheating degree of the low-pressure refrigerant at the refrigerant outlet side of the evaporator 30 or at the refrigerant suction side of the compressor 10 in the ejector cycle is mechanically or electrically detected based on the refrigerant temperature. Generally, the refrigerant temperature is related to the refrigerant pressure. Therefore, the superheating degree of the low-pressure refrigerant in the ejector cycle can be mechanically or electrically detected based on the refrigerant pressure.

In addition, the first embodiment can be combined with any one of the second to fourth embodiments.

Such changes and modifications are to be understood as being within the scope of the present invention as defined by the appended claims.

What is claimed is:

1. An ejector cycle comprising:
a compressor for drawing and compressing refrigerant;
a high-pressure heat exchanger for cooling high-pressure refrigerant discharged from the compressor;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger; and
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet of the low-pressure heat exchanger,
wherein the refrigerant flows through the low-pressure heat exchanger upwardly from below.

2. The ejector cycle according to claim 1, wherein:
the refrigerant inlet is positioned around a bottom end of the low-pressure heat exchanger and the refrigerant outlet is positioned around a top end of the low-pressure heat exchanger.

3. The ejector cycle according to claim 1, further comprising
a control unit which controls a refrigerant state to be introduced to the nozzle so as to control an adiabatic heat drop of refrigerant in the nozzle more than a predetermined value.

4. The ejector cycle according to claim 3, wherein the high-pressure heat exchanger is disposed to perform a heat exchange between the high-pressure refrigerant from the compressor and a cooling air so as to cool the high-pressure refrigerant, the ejector cycle further comprising:
a pressure detection means for detecting a pressure of the high-pressure refrigerant discharged from the compressor,
wherein the control unit controls an amount of the cooling air supplied to the high-pressure heat exchanger based on the pressure detected by the pressure detection means, to control the refrigerant state to be introduced to the nozzle.

5. The ejector cycle according to claim 3, wherein the high-pressure heat exchanger is disposed to perform a heat exchange between the high-pressure refrigerant from the compressor and a cooling air to cool the high-pressure refrigerant, the ejector cycle further comprising:
a temperature detection means for detecting a temperature of the cooling air supplied to the high-pressure heat exchanger, wherein the control unit controls an amount of the cooling air supplied to the high-pressure heat exchanger based on the temperature detected by the temperature detection means, to control the refrigerant state to be introduced to the nozzle.

6. The ejector cycle according to claim 1, further comprising
a control unit which controls a pressure of the high-pressure refrigerant discharged from the compressor so as to control a pressure of refrigerant flowing to the nozzle more than a predetermined value.

7. The ejector cycle according to claim 6, wherein the high-pressure heat exchanger is disposed to perform a heat exchange between the high-pressure refrigerant from the compressor and a cooling air to cool the high-pressure refrigerant, the ejector cycle further comprising:
a temperature detection means for detecting a temperature of the cooling air supplied to the high-pressure heat exchanger, wherein the control unit controls an amount of the cooling air supplied to the high-pressure heat exchanger based on the temperature detected by the temperature detection means, to control the pressure of refrigerant flowing to the nozzle more than the predetermined value.

8. The ejector cycle according to claim 1, wherein the high-pressure heat exchanger is disposed to perform a heat exchange between the high-pressure refrigerant from the compressor and a cooling air, the ejector cycle further comprising
a control unit which reduces an amount of the cooling air supplied to the high-pressure heat exchanger in accordance with a temperature reduce of the cooling air.

9. The ejector cycle according to claim 3, wherein the control unit has an upper limit control means for controlling a pressure of the high-pressure refrigerant discharged from the compressor to be lower than an upper limit value.

10. The ejector cycle according to claim 1, further comprising
a variable throttle device, disposed at a downstream side of the high-pressure heat exchanger, for variably decompressing high-pressure refrigerant before flowing to the nozzle.

11. The ejector cycle according to claim 1, wherein the refrigerant is one of freon, carbon dioxide and carbon hydride.

12. An ejector cycle comprising:
a compressor for drawing and compressing refrigerant;
a high-pressure heat exchanger for cooling high-pressure refrigerant discharged from the compressor;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and
a control unit which controls a refrigerant state to be introduced to the nozzle so as to control an adiabatic heat drop of refrigerant in the nozzle more than a predetermined value.

13. The ejector cycle according to claim 12, wherein the high-pressure heat exchanger is disposed to perform a heat exchange between the high-pressure refrigerant from the compressor and a cooling air so as to cool the high-pressure refrigerant, the ejector cycle further comprising:
a pressure detection means for detecting a pressure of the high-pressure refrigerant discharged from the compressor,
wherein the control unit controls an amount of the cooling air supplied to the high-pressure heat exchanger based on the pressure detected by the pressure detection means, to control the refrigerant state to be introduced to the nozzle.

14. The ejector cycle according to claim 12, wherein the high-pressure heat exchanger is disposed to perform a heat exchange between the high-pressure refrigerant from the compressor and a cooling air to cool the high-pressure refrigerant, the ejector cycle further comprising:
a temperature detection means for detecting a temperature of the cooling air supplied to the high-pressure heat exchanger;
wherein the control unit controls an amount of the cooling air supplied to the high-pressure heat exchanger based on the temperature detected by the temperature detection means, to control the refrigerant state to be introduced to the nozzle.

15. An ejector cycle comprising:
a compressor for drawing and compressing refrigerant;
a high-pressure heat exchanger for cooling high-pressure refrigerant discharged from the compressor;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and
a control unit which controls a pressure of the high-pressure refrigerant discharged from the compressor so as to control a pressure of refrigerant flowing to the nozzle more than a predetermined value.

16. The ejector cycle according to claim 15, wherein the high-pressure heat exchanger is disposed to perform a heat exchange between the high-pressure refrigerant from the compressor and a cooling air to cool the high-pressure refrigerant, the ejector cycle further comprising:
a temperature detection means for detecting a temperature of the cooling air supplied to the high-pressure heat exchanger,
wherein the control unit controls an amount of the cooling air supplied to the high-pressure heat exchanger based on the temperature detected by the temperature detection means, to control the pressure of refrigerant flowing to the nozzle more than the predetermined value.

17. An ejector cycle comprising:
a compressor for drawing and compressing refrigerant;
a high-pressure heat exchanger for cooling high-pressure refrigerant discharged from the compressor, the high-pressure heat exchanger being disposed to perform a heat exchange between the high-pressure refrigerant from the compressor and a cooling air;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet side of the low-pressure heat exchanger; and
a control unit which reduces an amount of the cooling air supplied to the high-pressure heat exchanger in accordance with a temperature reduce of the cooling air.

18. The ejector cycle according to claim 12, wherein the control unit has an upper limit control means for controlling a pressure of the high-pressure refrigerant discharged from the compressor to be lower than an upper limit value.

19. The ejector cycle according to claim 2, further comprising
a variable throttle device disposed at a downstream side of the high-pressure heat exchanger, for variably decompressing the high-pressure refrigerant before flowing to the nozzle.

20. The ejector cycle according to claim 12, wherein the refrigerant is one of freon, carbon dioxide and carbon hydride.

21. An ejector cycle comprising:
a compressor for drawing and compressing refrigerant;
a high-pressure heat exchanger for cooling high-pressure refrigerant discharged from the compressor;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet of the low-pressure heat exchanger, and
a control unit which controls a refrigerant state to be introduced to the nozzle so as to control an adiabatic heat drop of refrigerant in the nozzle more than a predetermined value; wherein
the low-pressure heat exchanger has a refrigerant outlet coupled to a refrigerant suction port of the ejector, and the refrigerant outlet is provided in the low-pressure heat exchanger at a position higher than the refrigerant inlet.

22. The ejector cycle according to claim 21, wherein the high-pressure heat exchanger is disposed to perform a heat exchange between the high-pressure refrigerant from the compressor and a cooling air so as to cool the high-pressure refrigerant, the ejector cycle further comprising:
a pressure detection means for detecting a pressure of the high-pressure refrigerant discharged from the compressor,
wherein the control unit controls an amount of the cooling air supplied tot eh high-pressure heat exchanger based on the pressure detected by the pressure detection means, to control the refrigerant state to be introduced to the nozzle.

23. The ejector cycle according to claim 21, wherein the high-pressure heat exchanger is disposed to perform a heat exchange between a high-pressure refrigerant from the compressor and a cooling air to cool the high-pressure refrigerant, the ejector cycle further comprising:
a temperature detection means for detecting a temperature of the cooling air supplied to the high-pressure heat exchanger, wherein the control unit controls an amount of the cooling air supplied to the high-pressure heat exchanger based on the temperature detected by the temperature detection means, to control the refrigerant state to be introduced to the nozzle.

24. The ejector cycle according to claim 21, wherein the control unit has an upper limit control means for controlling a pressure of the high-pressure refrigerant discharged from the compressor to be lower than an upper limit value.

25. An ejector cycle comprising:
a compressor for drawing and compressing refrigerant;
a high-pressure heat exchanger for cooling high-pressure refrigerant discharged from the compressor;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet of the low-pressure heat exchanger, and
a control unit which controls a pressure of the high-pressure refrigerant discharged from the compressor so as to control a pressure of refrigerant flowing to the nozzle more than a predetermined value; wherein
the low-pressure heat exchanger has a refrigerant outlet coupled to a refrigerant suction port of the ejector, and the refrigerant outlet is provided in the low-pressure heat exchanger at a position higher than the refrigerant inlet.

26. The ejector cycle according to claim 25, wherein the high-pressure heat exchanger is disposed to perform a heat exchange between the high-pressure refrigerant from the compressor and a cooling air to cool the high-pressure refrigerant, the ejector cycle further comprising:
a temperature detection means for detecting a temperature of the cooling air supplied to the high-pressure heat exchanger, wherein the control unit controls an amount of the cooling air supplied to the high-pressure heat exchanger based on the temperature detected by the temperature detection means, to control the pressure of refrigerant flowing to the nozzle more than the predetermined value.

27. An ejector cycle comprising:
a compressor for drawing and compressing refrigerant;
a high-pressure heat exchanger for cooling high-pressure refrigerant discharged from the compressor;
a low-pressure heat exchanger for evaporating low-pressure refrigerant after being decompressed;
an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;
a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet of the low-pressure heat exchanger, wherein the low-pressure heat exchanger has a refrigerant outlet coupled to a refrigerant suction port of the ejector, and the refrigerant outlet is provided in the low-pressure heat exchanger at a position higher than the refrigerant inlet;

the high-pressure heat exchanger is disposed to perform a heat exchange between the high-pressure refrigerant from the compressor and a cooling air, the ejector cycle further comprising a control unit which reduces an amount of the cooling air supplied to the high-pressure heat exchanger in accordance with a temperature reduce of the cooling air.

28. An ejector cycle comprising:

a compressor for drawing and compressing refrigerant;

a high-pressure heat exchanger for cooling high-pressure refrigerant discharged from the compressor;

a low-pressure heat exchanger for evaporating low-pressure refrigerant after being decompressed;

an ejector including a nozzle for decompressing and expanding refrigerant flowing from the high-pressure heat exchanger by converting pressure energy of refrigerant to speed energy of the refrigerant, and a pressure-increasing portion that is disposed to increase a pressure of refrigerant by converting the speed energy of refrigerant to the pressure energy of refrigerant while mixing refrigerant jetted from the nozzle and refrigerant sucked from the low-pressure heat exchanger;

a gas-liquid separator for separating refrigerant from the ejector into gas refrigerant and liquid refrigerant, the gas-liquid separator having a gas refrigerant outlet coupled to a refrigerant suction side of the compressor, and a liquid refrigerant outlet coupled to a refrigerant inlet of the low-pressure heat exchanger, and a variable throttle device, disposed at a downstream side of the high-pressure heat exchanger, for variably decompressing high-pressure refrigerant before flowing to the nozzle; wherein the low-pressure heat exchanger has a refrigerant outlet coupled to a refrigerant suction port of the ejector, and the refrigerant outlet is provided in the low-pressure heat exchanger at a position higher than the refrigerant inlet.

29. The ejector cycle according to claim 1, wherein the low-pressure heat exchanger provides a passage through which the refrigerant flows performing a heat exchanger with an air passing through the low-pressure heat exchanger, and the refrigerant flows through the passage only upwardly from the below in a gravity direction.

* * * * *